United States Patent
DeSorbo et al.

(10) Patent No.: US 7,318,678 B2
(45) Date of Patent: *Jan. 15, 2008

(54) SELF LOCKING ERGONOMIC SUPPORT ASSEMBLY FOR OPTICAL DEVICES

(75) Inventors: Alexander P. DeSorbo, Woodbury, CT (US); Carl A. Hultman, Derby, CT (US); Joseph P. Teodosio, Seymour, CT (US)

(73) Assignee: Anton/Bauer, Inc., Shelton, CT (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/122,542

(22) Filed: May 5, 2005

(65) Prior Publication Data

US 2005/0201744 A1    Sep. 15, 2005

Related U.S. Application Data

(63) Continuation-in-part of application No. 10/811,747, filed on Mar. 29, 2004, now Pat. No. 7,293,924, which is a continuation of application No. 10/431,912, filed on May 8, 2003, now Pat. No. 6,929,409.

(60) Provisional application No. 60/441,365, filed on Jan. 21, 2003.

(51) Int. Cl.
    *G03B 17/00*    (2006.01)
(52) U.S. Cl. .................................................... 396/420
(58) Field of Classification Search ................ 396/419, 396/420, 421–422
    See application file for complete search history.

(56) References Cited

U.S. PATENT DOCUMENTS

| | | | |
|---|---|---|---|
| 2,636,822 A * | 4/1953 | Anderson | 224/185 |
| 2,873,645 A | 2/1959 | Horton | |
| 3,490,724 A | 1/1970 | Ichikawa | |
| 4,244,500 A | 1/1981 | Fournier | |
| 4,437,753 A | 3/1984 | Dunn | |
| 4,509,795 A | 4/1985 | Brennan et al. | |
| 4,727,390 A * | 2/1988 | Brown | 396/420 |
| 4,943,820 A | 7/1990 | Larock | |
| 4,963,904 A | 10/1990 | Lee | |
| 4,976,387 A * | 12/1990 | Spianti | 224/262 |
| 5,294,947 A * | 3/1994 | Harrington | 396/420 |
| 5,612,756 A | 3/1997 | Kardach | |
| 5,890,025 A | 3/1999 | Hart | |
| 6,056,449 A | 5/2000 | Hart | |
| 6,601,999 B1 * | 8/2003 | McTeer | 396/420 |
| 6,929,409 B2 * | 8/2005 | DeSorbo et al. | 396/420 |
| 2002/0067922 A1 * | 6/2002 | Harris | 396/420 |

* cited by examiner

*Primary Examiner*—Christopher Mahoney
(74) *Attorney, Agent, or Firm*—McCormick, Paulding & Huber LLP

(57) ABSTRACT

A support assembly for supporting an optical recording device about an operator includes a shaft having a first distal end for mounting the optical recording device, and a second distal end for bearing against the back of the operator. A friction plate arm is slidably disposed on the shaft and pivotable movement of the friction plate selectively captures the operator between the friction plate and the second distal end, thus causing the friction plate to frictionally lock against said shaft.

27 Claims, 9 Drawing Sheets

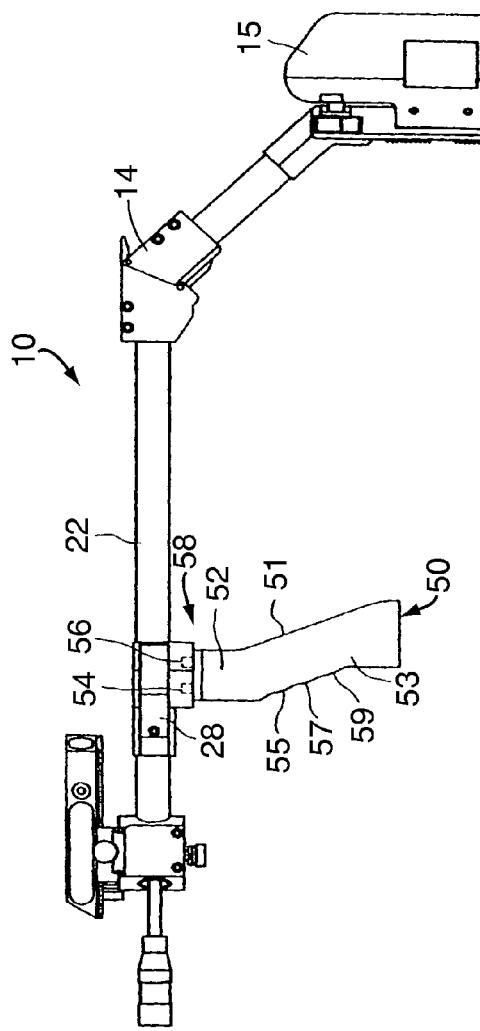
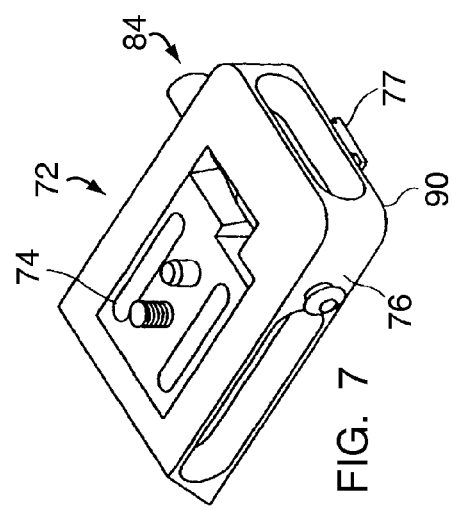
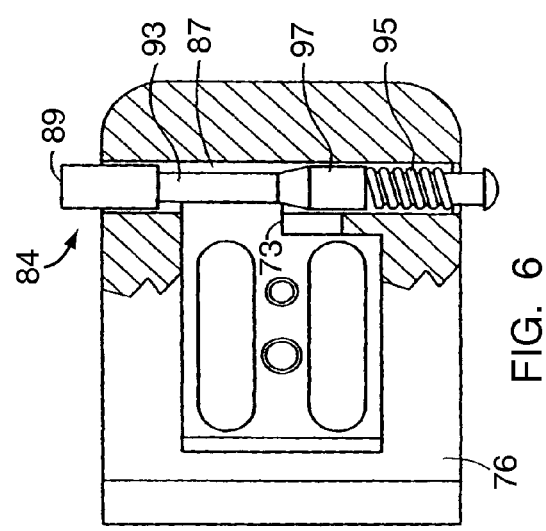
FIG. 8
FIG. 7
FIG. 6

SELF LOCKING ERGONOMIC SUPPORT ASSEMBLY FOR OPTICAL DEVICES

CROSS-REFERENCE TO RELATED APPLICATIONS

This application is a continuation-in-part of U.S. patent application Ser. No. 10/811,747 filed Mar. 29, 2004 which is a continuation of U.S. patent application Ser. No. 10/431,912, filed May 08, 2003, now U.S. Pat. No. 6,929,409 which claims priority from U.S. Provisional Patent Application Ser. No. 60/441,365, filed Jan. 21, 2003, all of which are hereby incorporated by reference in their entireties.

FIELD OF THE INVENTION

The present invention relates generally to a self-locking ergonomic support assembly for optical devices, and deals more particularly with a self-locking ergonomic support assembly that utilizes a clamping mechanism for supporting a camera or a camcorder on an operator's upper torso. The present invention utilizes a friction-coupled clamping mechanism to providing stability with minimal manual support and is suitable for use with still or video cameras.

BACKGROUND OF THE INVENTION

One of the major challenges faced in filming moving objects or activities with varied speed, for example, while skiing, is stabilizing the camera, even though many modern video cameras have built-in electronic image stabilizing circuitry. While these circuits are helpful in reducing the minor fluctuations of camera movement, they cannot distinguish between purposeful movement of the camera and accidental movement as a result of operator fatigue. Moreover, the frequent use of long lenses and digital zoom capabilities of cameras requires the physical stabilization of the camera in order to minimize the camera's movement which otherwise would result in image shifts several times that of the camera movement.

Various solutions are available to assist with this problem, for example, tripods, monopods, and different types of frame assemblies. Tripods can stabilize the camera movement but restrict portability. Frame assemblies for mounting cameras on the human body for stabilization are typically not designed for the size, weight and ergonomics of the small, palm-sized handheld digital cameras of today.

Older video cameras, by example, are typically larger and heavier than modern cameras, which required them to be rested directly on the operator's shoulders. The viewfinder of these cameras was positioned outboard of the camera body and toward the operator thereby placing it in a natural position in front of the operator's eye. The overall weight of the camera was borne on the operator's shoulder with the center of gravity of the camera being placed on the point of the operators shoulder.

With the advent of smaller "palm-sized" handheld camcorders, the viewfinder is typically placed on the centerline of the camcorder, with all of the camcorder's weight being borne on the operators' arm in front of his body. Thus, known shoulder mounting assemblies are insufficient for newer, smaller cameras and camcorders as locating such newer and smaller cameras upon the shoulder of an operator places the viewfinder off-line from the operator's eyes.

Moreover, during prolonged filming, the ergonomics of known shoulder mounted camcorder designs lead to operator fatigue and camera instability, thereby reducing the quality of the recorded images as the camera shakes and shudders as a result.

An example of a frame assembly for supporting a camera is disclosed in U.S. Pat. Nos. 5,890,025 and 6,056,449 issued to Hart. The assembly is comprised of a rigid frame having a front and a rear portion with a pair of shoulder rests constructed to rest on the shoulders of the wearer. This type of device has the disadvantage of being bulky, cumbersome and heavy, defeating the ergonomics and the performance of the small handheld cameras or camcorders.

With the forgoing problems and concerns in mind, it is the general object of the present invention to provide a self-locking ergonomic support for supporting a camera or a camcorder which overcomes the above-described drawbacks.

SUMMARY OF THE INVENTION

Thus, there is a need for an improved support for a small camera or camcorder that is self-stabilizing, lightweight, portable, requires minimal support from the operator and optimizes the ergonomics and performance of small handheld cameras or camcorders. The shoulder mounted camera support assembly described herein provides a solution for that problem.

It is therefore an object of the present invention to provide a self-locking ergonomic support assembly for supporting a camera or a camcorder.

It is another object of the present invention to provide a self-locking ergonomic support assembly for supporting a camera or a camcorder that allows the camera to be self-balanced on the operator's shoulder.

It is another object of the present invention to provide a self-locking ergonomic support assembly for supporting a camera or a camcorder which is lightweight, portable, stable, easily manipulated by the operator and improves the functionality of the camera by easily adapting to other accessories and can be set up quickly.

It is another object of the present invention to provide a self-locking ergonomic support assembly that utilizes an integral component of the camera or camcorder itself to provide a counterweight to the support assembly.

It is another object of the present invention to provide a self-locking ergonomic support assembly that is modular in design.

It is another object of the present invention to provide a self-locking ergonomic support assembly that hides the electrical wiring for the camera or camcorder within the structure of the modular design.

It is another object of the present invention to provide a self-locking ergonomic support assembly that utilizes a friction-coupled claming mechanism to secure the support assembly to an operator's body.

Another objective of the invention is to provide a shoulder mounted camera support with collapsible or detachable members thereby requiring minimal storage space and is easily assembled or disassembled for flexible use with a variety of cameras or camcorders.

A further objective of the present invention is to provide a shoulder mounted camera support with means to attach the camera or camcorder camera mount securely yet capable of quick release for operation in a variety of filming situations and applicable to a variety of cameras.

Yet another object of the invention is to provide a shoulder mounted camera support with means to mount and adjust a variety of cameras so that the viewfinder of the camera or camcorder can be aligned with the operator's eye.

In accordance with the above-stated objects, the present invention provides a collapsible or detachable shoulder mounted camera support for holding a camera or a camcorder while filming or recording. The device is comprised of modular units having a front and a rear portion stabilized on the shoulder of the operator by using the battery powering the camera or camcorder as a counterweight. Any appropriate lightweight, sturdy and easily fabricated material with sufficient strength to hold a camera or a camcorder, such as plastic or metal may be used to construct the present assembly.

In one embodiment of the invention, the shoulder mounted camera support is collapsible with a pair of pivot knuckles operating about a rotary axis (X and Y-axes, respectively) connecting the front and the rear portions of the shoulder mounted camera support and provide for the breakdown of the device for easy transport. This feature also allows the camera support to be collapsed and positioned on a flat surface serving as a base so that the device can be converted to a pod for supporting the camera or camcorder while filming.

The front portion has a clutch-operated slideable breastplate hingedly connected to a horizontal-supporting shaft, which rests on the operator's chest securing the camera support assembly to the operator's body for stability. The breastplate also serves to support the forward weight of the camera, relieving the operator's arm. The dutch on the breastplate enables the breastplate to be adjusted securely in a comfortable, non-movable position against the operator's body. An additional pivot knuckle extends from the front portion of the shoulder mounted camera support with a second horizontal-supporting shaft for slideable attachment to a camera shoe and mount assembly. This second horizontal supporting shaft is oriented slightly off-center from the axis of the first horizontal shaft by a foldable knuckle aiding in the collapsibility of the device for transportation purposes. The second horizontal-supporting shaft is oriented at approximately 16° from the first shaft providing for the in-line or linear alignment of the camera's viewfinder relative to the operator's eye and relative to the centerline of the operator's shoulder. The front pivot knuckle rotates about a vertical axis (Y-axis).

The camera or camcorder can be affixed directly to the second horizontal shaft or mounted on a shoe and mount assembly that is slideably connected to the second, angled, horizontal shaft portion of the shoulder mounted camera support for adjustably positioning the camera or camcorder in a horizontal plane. The shoe and mount assembly can be adjusted for use with a variety of cameras or camcorders as the shoe is in mating engagement with the bottom of the camera or camcorder unit. The shoe is loaded into the mount and is retained in place by a spring biased locking means for interaction with a surface of the shoe.

A channel-shaped-groove is provided on the base of the mount for engagement with a complementary perpendicular channel-shaped-groove that is fitted with a slide to be slideably connected to a mounting bracket that is disposed at the front of the shoulder mounted camera support for adjustment of the camera or camcorder's position in a horizontal plane.

In a preferred embodiment, the rear portion of the shoulder mounted camera support assembly is detachably connected to a battery pack which provides power for the camera and additional power for accessories, such as a camera light or wireless microphone receivers, and provides additional counter-balancing for the camera or camcorder.

The shoulder mounted camera support may be mounted to a stationary stabilizing device, such as a tripod or monopod, in lieu of the operator's shoulder and body.

In another embodiment of the invention, the front portion of the shoulder mounted camera support assembly is detachable as the pivot knuckles are substituted with a releasable connector to allow further disassembly for convenient storage and transport.

In yet another embodiment of the invention, a detachable pistol grip is threadably attached to the bottom of the shoulder mounted camera support by appropriate securing means, for example, nuts, bolts, pins, threaded fasteners, screws or some combination thereof.

The pistol grip is releasably attached to the front portion of the shoulder mounted support assembly, and can be used with a variety of camcorders or cameras yet still maintain the proper gravitational balance while supporting the camcorder. The pistol grip may house the camcorder's supplemental controls or battery pack within the housing. The pistol grip is compact and lightweight and capable of being used by ether the right or the left hand promoting maneuverability of the camcorder without creating fatigue after prolonged use.

A support assembly is therefore provided for supporting an optical recording device in front of an operator. The support assembly includes a shaft having a first distal end for mounting the optical recording device adjacent the first distal end, and a second distal end for bearing against the back of the operator. A friction plate is slidably disposed on the shaft and movement of the friction plate selectively captures the operator between the friction plate and the second distal end, thus causing the friction plate to frictionally lock against said shaft.

In accordance with an alternative embodiment, it is another object of the present invention to provide a support assembly for an optical device that allows unfettered access to the electrical wiring connected to the optical device.

It is another object of the present invention to provide a support assembly for an optical device having a structural offset associated therewith so as to enable the ergonomic positioning of the optical device with respect to an operator's eye.

Yet another object of the invention is to provide a shoulder mounted camera support with means to mount and adjust a variety of cameras so that a viewfinder or a flip-out viewscreen of the camera or camcorder can be aligned with the operator's eye.

In accordance with the above-stated objects, the present invention provides a support assembly for supporting an optical recording device in front of an operator includes a contoured support having a first distal end for mounting the optical recording device and a second distal end for bearing against a back of the operator. An arm is slidably disposed on the contoured support such that pivoting movement of the arm selectively causes a friction post to bear against the contoured support, thereby causing the arm to frictionally lock against the contoured support.

These and other objectives of the present invention, and their preferred embodiments, shall become clear by consideration of the specification, claims and drawings taken as a whole.

BRIEF DESCRIPTION OF THE DRAWINGS

Further objectives and advantages of the invention will become more apparent from the following description and claims, as from the accompanying drawings, wherein:

FIG. 6 is top plan view, partly in section of the camera or camcorder mount of the shoulder mounted camera support assembly shown in FIG. 1; and FIG. 7 is a view similar to FIG. 6 with a shoe connected to the camera or camcorder locked to the mount.

FIG. 8 is a side view in elevation view of the pistol grip assembly attached to the shoulder mounted camera support assembly, in accordance with another embodiment of the present invention.

DETAILED DESCRIPTION OF THE PREFERRED EMBODIMENT

Figure 1:
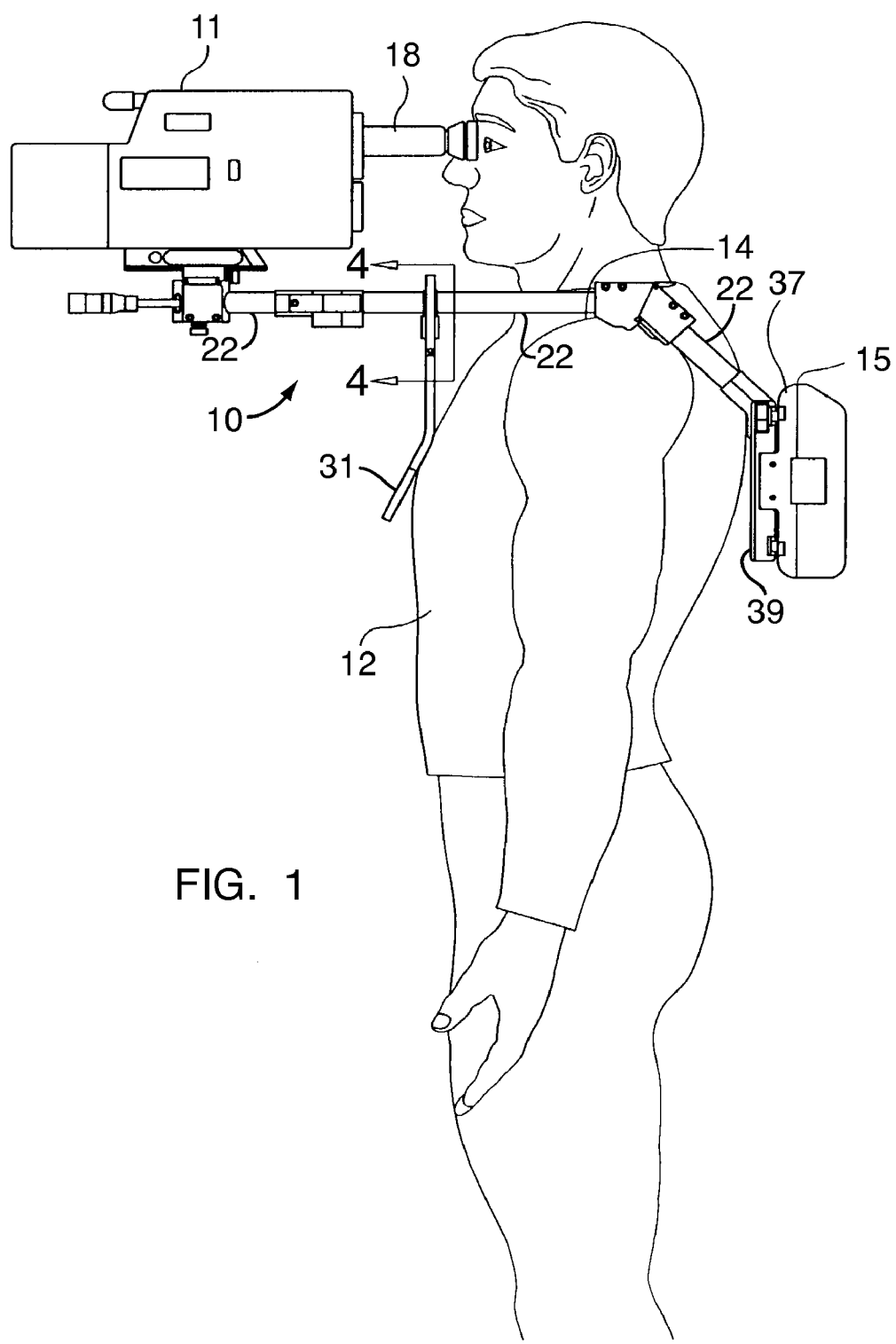
FIG. 1 is a side view of the shoulder mounted camera support assembly according to the present invention in use by an operator.

Referring now to the drawings in detail, wherein like numerals indicate like elements throughout the several views in accordance with the invention. A camera or camcorder 11 can be mounted on a shoulder mounted camera support assembly 10 constituting the subject of the present invention.

FIG. 1 is a side view of the shoulder mounted camera support assembly 10 according to the present invention in use by an operator 12 where the shoulder mounted camera support assembly 10 is independently supported and stabilized on the operator's shoulder 14. The shoulder mounted camera support assembly 10 comprises a front portion to which the camera or camcorder 11 is attached and a rear portion for receipt of a battery pack 15.

Figure 2:
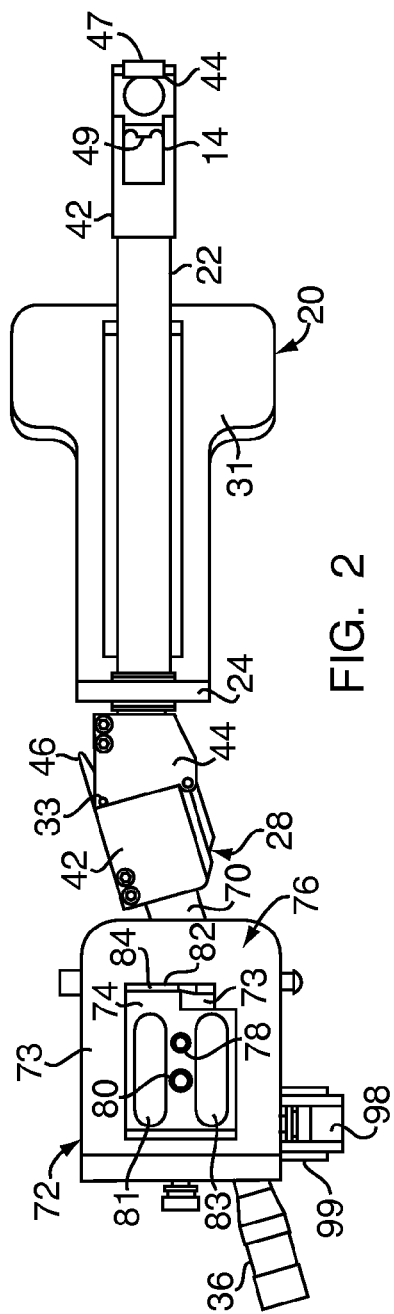
FIG. 2 is a top plan view of the shoulder mounted camera support of FIG. 1.
Figure 3:
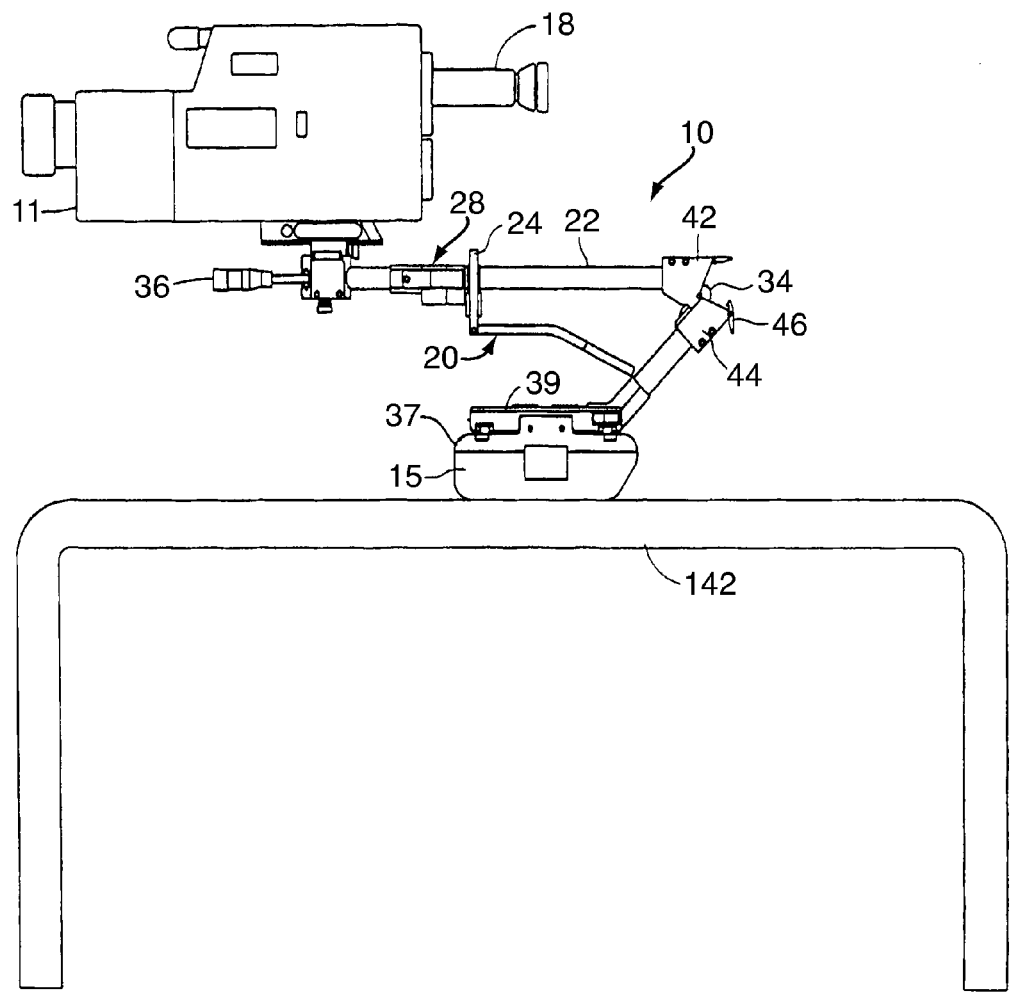
FIG. 3 is a side view of the shoulder mounted camera support assembly in use as a pod seated on a flat surface.

FIG. 2 is a top view and FIG. 3 an enlarged side view of the camera support assembly 10 for the camera or camcorder 11. The front portion of the shoulder mounted camera support 10 has a hollow shaft 22 projecting horizontally and forwardly from a rear pivot knuckle 14, through which a flexible power cable 34 (not shown) can be threaded from a power source, such as a battery pack 15, to the camcorder or camera 11. The power cable 34 (not shown) terminates at an electrical connector 36 of the type that is well known and used in the art for ready connections to a camera or camcorder 11.

It is therefore an important aspect of the present invention that the hollow shaft 22 of the support assembly 10 provides a sheltered conduit through which to run the power cable 34, or the like. In this manner, the present invention effectively protects the power cable 34 from harsh environmental conditions, as well as preventing any snagging or damage to the power cable during transportation or use.

Figure 4:
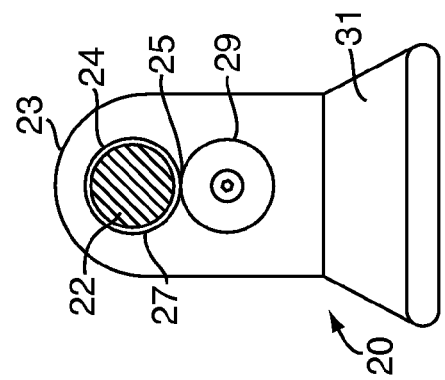
FIG. 4 is a cross-sectional view taken substantially along the plane indicated by line 4-4 of FIG. 1.

As shown in FIG. 4, extending perpendicularly from the horizontal shaft 22 is a breastplate 20 that is rotatable about a hinge 21 intermediate its length. The upper portion 23 of the breastplate 20 is mounted on the horizontal shaft 22 of the shoulder mounted camera support assembly 10 through a bushing 24 provided with a circular aperture 27 in the bushing 24 receiving the horizontal shaft 22 there through. The bushing 24 has a cam 29 mounted on opposite sides of the bushing 24 on the opposite sides of the upper portion of the breastplate 20 such that a portion of the circumference of each cam 29 seats exactly in an arced groove formed on the bottom of shaft 22 when the upper portion 23 of breastplate 20 is perpendicular to horizontal shaft 22 as shown in FIG. 4, such that the breastplate 20 can be slideably adjusted along the shaft 22, yet locked into a desired position when the bottom hinged portion 31 is extended by pivoting it about hinge 21 into contact with the chest of the operator 12 which cants the cams 29 into frictional clutching engagement with the groove 25 in the bottom of shaft 22. The breastplate 20 may be partially folded, collapsing inward from its use position illustrated in FIG. 1 and slideably adjusted at varying positions on the horizontal shaft 22 when the rear potion of the shoulder mounted camera support assembly 10 is collapsed into a pod as further described in conjunction with in FIGS. 3 and 5.

The clutched breastplate 20 extends downwardly approximately 6 inches from the bushing 24 and is arched at an angle in the middle of the breastplate 20 such that the breastplate 20 readily abuts with the operator's chest as shown in FIG. 1. The shape of the breastplate 20 allows it to be easily tilted to conform to the operator's desired fit. The breastplate 20 may comprise of any shape that safely and comfortably fits an operator's chest.

As described herein, the breastplate 20 and hollow shaft 22 act as a friction-coupled clamping mechanism that securely captures an operators shoulder and upper torso between the breastplate 20 and a bearing surface 39 of a female plate 37 (to be described in more detail later), as shown in FIG. 1.

It is therefore yet another important aspect of the present invention that a hands-free stabilization of the camera support 10 may be accomplished via a simple and infinitely adjustable friction-coupled clamping mechanism. Thus, by merely moving the breastplate 20 along the hollow shaft 22 until the bottom hinged portion 31 contacts the chest of an operator, the support assembly 10 may be securely—yet releasably—affixed to the upper torso of an operator. Moreover, the capturing of an operator's upper torso and shoulder area between the breastplate 20 and the bearing surface 39 provides a sufficient enough bias to the distal end of the bottom hinged portion 31 that the camera-end of the hollow shaft 22 is not permitted to deflect downwards. Thus, any camera mounted to the hollow shaft 22 is maintained in an operative position.

It will be readily appreciated that in stark contrast to known camera support systems, the present invention significantly reduces the physical structure needed to hold the support assembly 10 to the operator's body. Moreover, the frictional nature of breastplate 20 provides an easily, and infinitely, adjustable clamping mechanism whose clamping force may be modified to fit the comfort and needs of a particular operator.

In another embodiment of the invention, the breastplate 20 may be replaced with a pistol grip 50. The pistol grip 50 is constructed with a detachable elongated firm handle 52 portion that is secured to the shoulder mounted camera support assembly 10 by appropriate securing means, for example, nuts, bolts, pins, threaded fasteners, screws or some combination thereof. The pistol grip 50 is attached to the bottom of the camera support assembly 10 by a threaded fastener 54 and a retractable locating pin 56 as seen in FIG. 8. This secures the pistol grip 50 into the preferred position for maneuvering and operating the shoulder mounted camera support assembly 10.

The pistol grip 50 is releasably attached to the shoulder mounted camera support assembly 10 and includes the circuitry to control one or more functions of the camera or camcorder 11, such as power, zooming, iris and focus among others. When attached, the pistol grip 50 assists in the maneuvering and operability of the camera or camcorder 11 which position is maintained by the counterbalance of the battery pack 15 on the rear of the shoulder mounted camera support assembly 10, positioned over the shoulder 14 and along the back of the operator 12.

It is therefore another important aspect of the present invention that an integral component of the support assembly, such as the battery pack 15, is utilized to provide the counterweight to the mass of the camera or camcorder mounted on the opposing distal end of the support assembly 10. By utilizing an integral component of the support assembly 10, the present invention avoids the use of extraneous counterweights, and thus reduces the size and overall weight of the support assembly 10.

As shown in FIG. 8, the elongated firm handle 52 may be of a hollow or solid construction with a solid rectangular top portion 58 for ready annexation to the support's pivot knuckle 28. The rear portion 51 of the elongated firm handle 52 may be angled for a comfort fit, whereas the front portion 53 of the elongated firm handle 52 may be contoured with raised finger positions 55, 57 and 59 for added comfort.

The pistol grip 50 may also be attached directly to the bottom of the camera or camcorder 11 in such a manner as to preclude tipping or canting of the camera or camcorder 11 by balancing the camcorder or camera 11 on the pistol grip 50 by appropriate location of the pistol grip 50 relative to the weight of the camera 11. However, the wrist and arm of the operator 12 could become subject to fatigue, if used for an extended period of time.

The horizontal shaft 22 shown in FIG. 2 is also connected at the distal end to a front pivot knuckle 28 and may be secured to the front pivot knuckle 28 by welding, a threaded fastener or any other appropriate securing means. In the preferred embodiment, the horizontal shaft 22 is threadedly connected to the pivot knuckle 28.

The pivot knuckle 28, as with the pivot knuckle 14 has two opposed parts 42, 44 in mating engagement with each other and are connected together by a hinge 33. The opposed faces of the pivot knuckle 28 and 14 pivot on hinge 33; the only difference is that the parts 42, 44 of knuckle 14 pivot along the X-axis and parts 42, 44 pivot along a Y-axis when a pivotal latch lock 46 on rear face 44 having a hook end 47 received over a mating surface 49 on part 42 is released. This construction allows the front portion of the shoulder mounted camera support assembly 10 to swivel about an X and Y axis and collapse about the hinged knuckles 14 and 28 for ease of transportation and housing as shown in the collapsed configuration indicated in FIG. 5.

Figure 5:
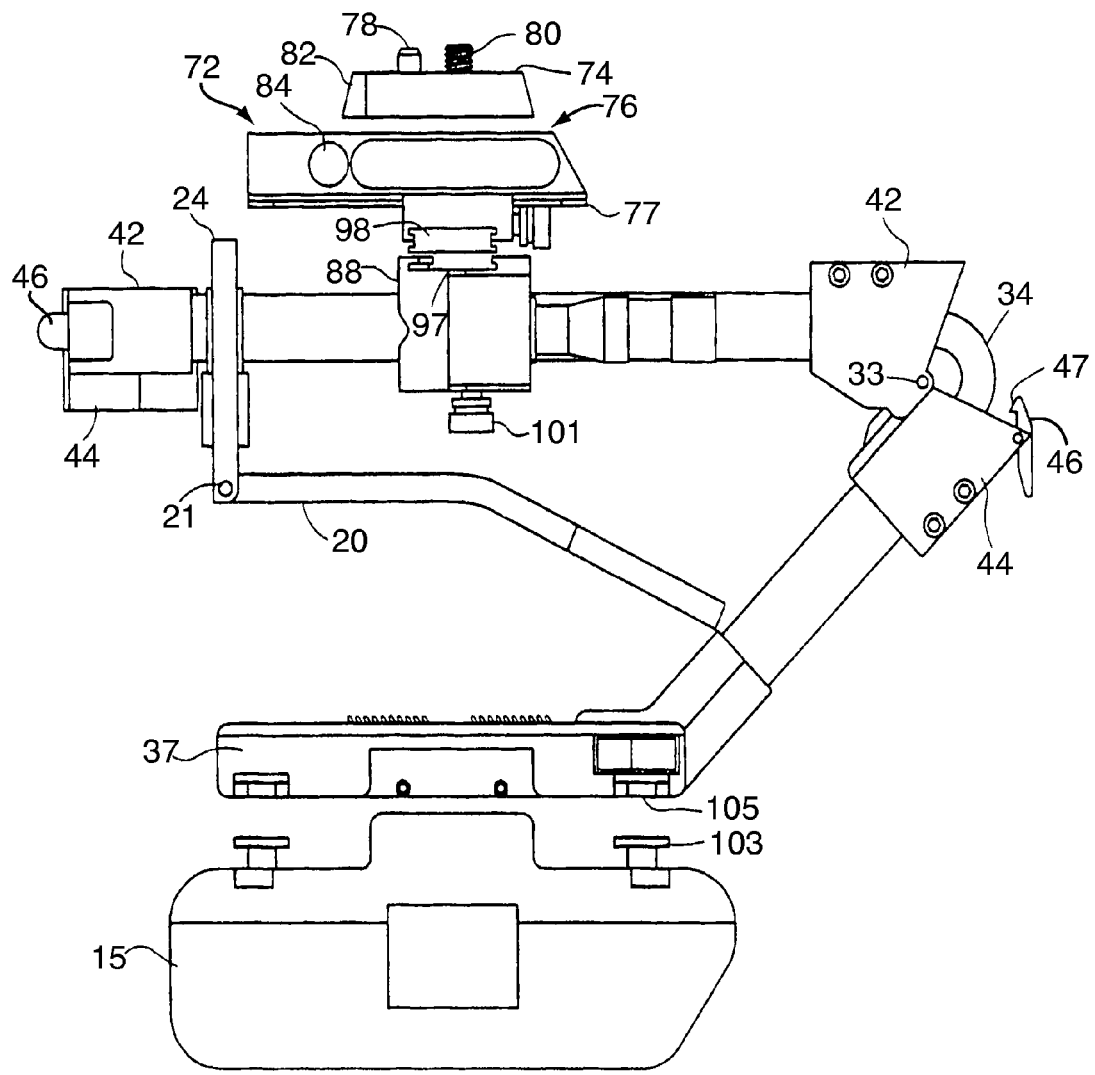
FIG. 5 is an enlarged, exploded side view of the shoulder mounted camera support assembly collapsed for storage or transport.

Although the present invention has been shown in FIG. 5 with the power cable 34 extending continuously through the hollow shaft 22, the present invention is not limited in this regard. Indeed, it is another important aspect of the present invention that at least each of the pivot knuckles, 28 and 44, be fashioned as quick release knuckles. That is, the present inventions encompasses pivot knuckles that include two integrally and selectively connected halves, which may be detached from one another via the operation of a linearly displaceable collar, or the like. Moreover, when utilizing quick release knuckles to releasably connect the various portions of the hollow shaft 22, the power cable 34 is no longer continuous, as shown in FIG. 5. Rather, the power cable 34 includes termination ends that can be easily mated when the two halves of the quick release knuckles are joined.

Figure 5A:
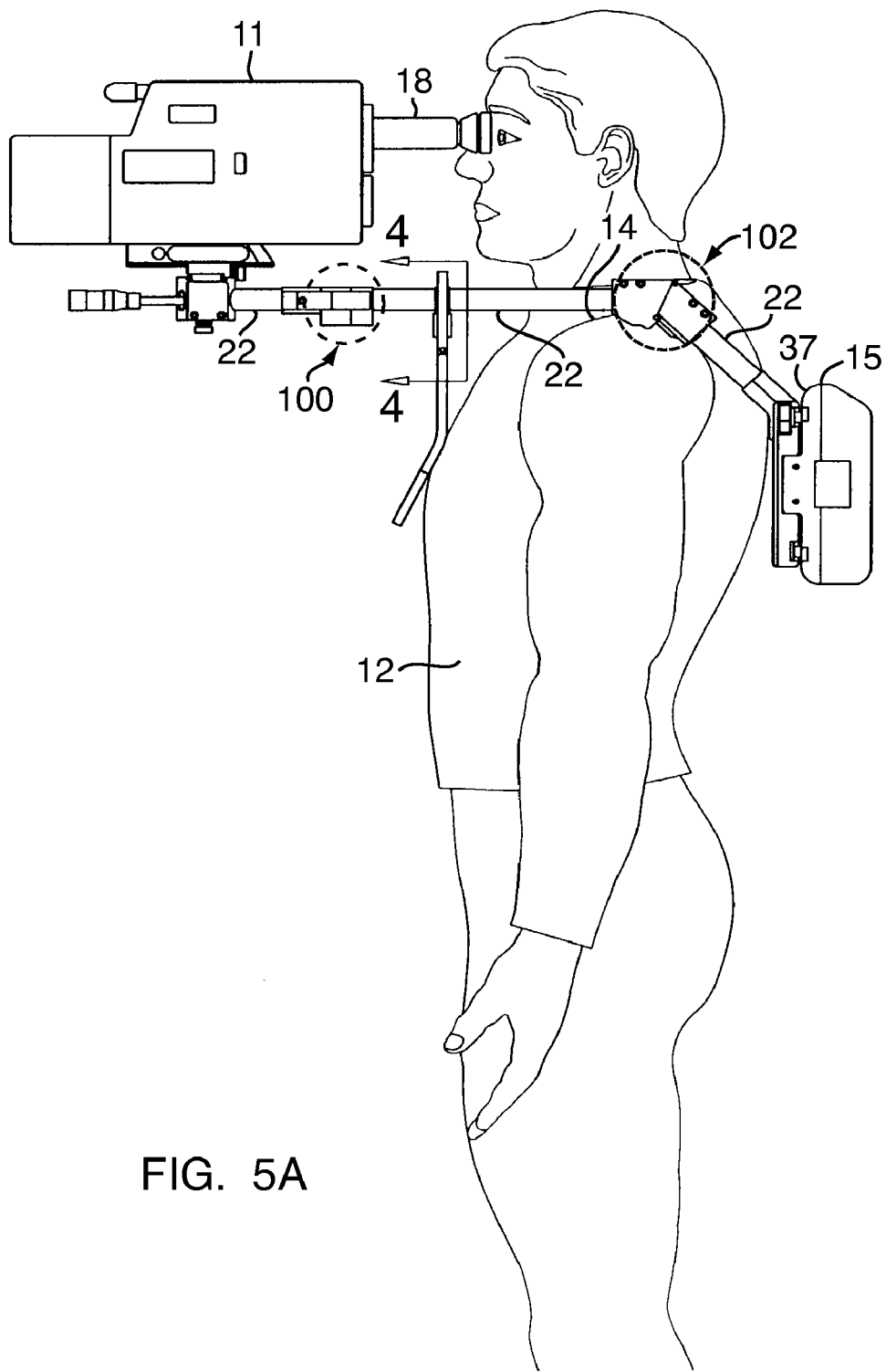
FIG. 5A illustrates an alternative embodiment of the present invention in which quick release knuckles are utilized.

In accordance, therefore, with this alternative embodiment of the present invention, the support assembly 10 becomes modular in design, and permits the removal or replacement of the differing sections of the support assembly 10 at the desire of the operator. FIG. 5A depicts such an alternative embodiment where the knuckles 100 and 102 are structurally and electrically connected via quick release joints that permit the selective decoupling of one section of the shaft 22 (and, therefore, the one section of the power cable 34) from another in a quick and non-technically demanding manner.

It will thus be readily appreciated that damage to one section of the support assembly 10 will not cause the entirety of the support assembly 10 from losing its value, as another replacement section can be easily substituted therefore.

Returning now to the embodiment in FIGS. 1-5, it can be seen that projecting from the second part 42 of pivot knuckle 28 is a horizontal supporting shaft 70 for slideably attaching a camera or camcorder shoe and mount assembly 72 illustrated in detail in FIGS. 2 and 5. The horizontal shaft 70 is offset at a nominal angle of 16° to the axis of shaft 22 to accommodate the linear alignment of the cameras or camcorder's viewfinder 18 with the operator's eye.

A shoe and mount assembly 72 is configured for the shoe 74 to be in mating engagement with the bottom of the camera or camcorder 11. As seen in FIG. 5, the shoe 74 is detachable and is dimensioned to center fit a corresponding indent 73 in the top surface 75 of the mount 76. The shoe 74 is configured with a locating pin 78 to be placed in a an aperture (not shown) in the bottom of the camera or camcorder so as to enable a threaded connector 80 to be threadedly connected into a threaded receiving recess (not shown) in the bottom of the camera or camcorder 11. The top surface 82 of the shoe has abrasion pads 81, 83 for frictional engagement with the bottom of the camera or camcorder 11.

Once assembled to the camera or camcorder 11, the shoe 74 may be loaded into the mount 76 and is retained in position by locking means 84. The locking means 84 includes a spring-biased pin 85 held captive within a slot 87 as shown in FIGS. 6 and 7.

Pushing inward on the head 89 of pin 85 against the bias of spring 95 as shown in FIG. 6 positions an undercut or thinner diameter portion 93 of the pin 85 adjacent to the projecting cam surface 82 of shoe 74 so the shoe can be positioned wholly within recess. Release of head 89 enables a thicker beveled portion 97 of the pin shaft or body to abut a portion of downwardly angled cam surface 82 to lock the shoe against removal.

The base of the mount 76 is connected to a horizontal slide assembly 77 which is slideably mounted on bracket 88 by relatively slideable, perpendicularly oriented channel members 98, 99 that are disposed on the shaft 70 of the shoulder mounted camera support assembly 10 and held in adjusted position by thumb screws 101. The mounting bracket 88 is oriented slightly off-center to shaft 70 to perfect the alignment of the camcorder's viewfinder 88 relative to the operator's eye using the sliding adjustments in the X and Y directions in a horizontal plane.

It will be readily appreciated that the mount 76 may be fashioned to slide any desired distance, however in a preferred embodiment of the present invention the mount 76 is designed to slide by an amount that is at least equal to the displacement of the shaft 70 from the axis of the shaft 22. That is, although the axis shaft 70 is displaced, or angled, from the axis of the shaft 22 so as to better position the eye-viewfinder of the camera in opposition to the eye of an operator, many cameras and camcorders now also provide flip-out viewfinders that extend out and away from the body of the camera/camcorder. When such flip-out viewfinders are utilized, the operator can slide the mount 76 by an amount necessary to compensate for the offset of the shaft 70 from the shaft 22, so that the flip-out viewfinder is now substantially directly opposing the eye of the operator. Thus, the present invention provides appropriate alignment between the eye of an operator and the viewfinder of an optical recording device, regardless of which viewfinder is employed by the operator.

The rear portion of the shoulder mounted camera support 10 comprises of a unitary hollow shaft 18 where the power cable 34 can be directed from the battery pack 15 to the camcorder 11. The hollow shaft 18 is secured to the rear pivot knuckle 14 by welding, a threaded fastener or any other appropriate securing means. This hollow shaft 18 in this embodiment may extend downward at an angle from the rear pivot knuckle 14 to a plate 25 for ready connection to the male plate on a battery pack 15. The battery pack 15 serves as a counterbalance for the camera or camcorder 11 positioned on mounting bracket 88, so the camera or camcorder is level and parallel to the ground.

In the preferred embodiment, the male plate of the battery pack is received on a female plate 37 of the type that is shown in U.S. Pat. No. 4,810,204 to Wilson. The substantially flat male plate of the battery pack 15 has a plurality projections 103 received within slots 105 on the female plate 37 and female electrical terminals positioned within a recess for engagement with male electrical terminals on the female plate. Thus, the female and male plates of the battery pack 15 can be coupled and locked together. The assembled battery pack with plates can be attached to the rear portion of the shoulder mounted camera support assembly 10 counterbalancing the front portion of the shoulder mounted camera support assembly 10 providing independent stability without manual support.

FIG. 3 illustrates a side view of the shoulder mounted camera support assembly 10 in use on a flat surface, as a pod, or camera or camcorder support in lieu of a tripod. As seen in FIGS. 3, the rear portion of the shoulder mounted camera support 10 is collapsed at the rear part 44 of the pivot knuckle 14 to create a pod that can be mounted and rotated on a flat surface 142 or attached to a one-legged support (not shown).

The rear pivot knuckle 14 has two opposed parts 42, 44 in mating engagement with each other and are connected together by hinge 33. The opposed faces of the pivot knuckle 14 when released from the latch lock 46 pivots about-hinge 33 the X-axis downwardly extending at an angle of approximately 120° between the secured and unlatched position of the latch lock 46. When the rear portion of the shoulder mounted camera support 10 is rotated open, the breastplate 20 can be partially folded, collapsing inward from the pivot hinge 21 which connects the upper and lower portions of the breastplate 20 to accommodate the extension of the rear pivot knuckle 14.

Figure 9:
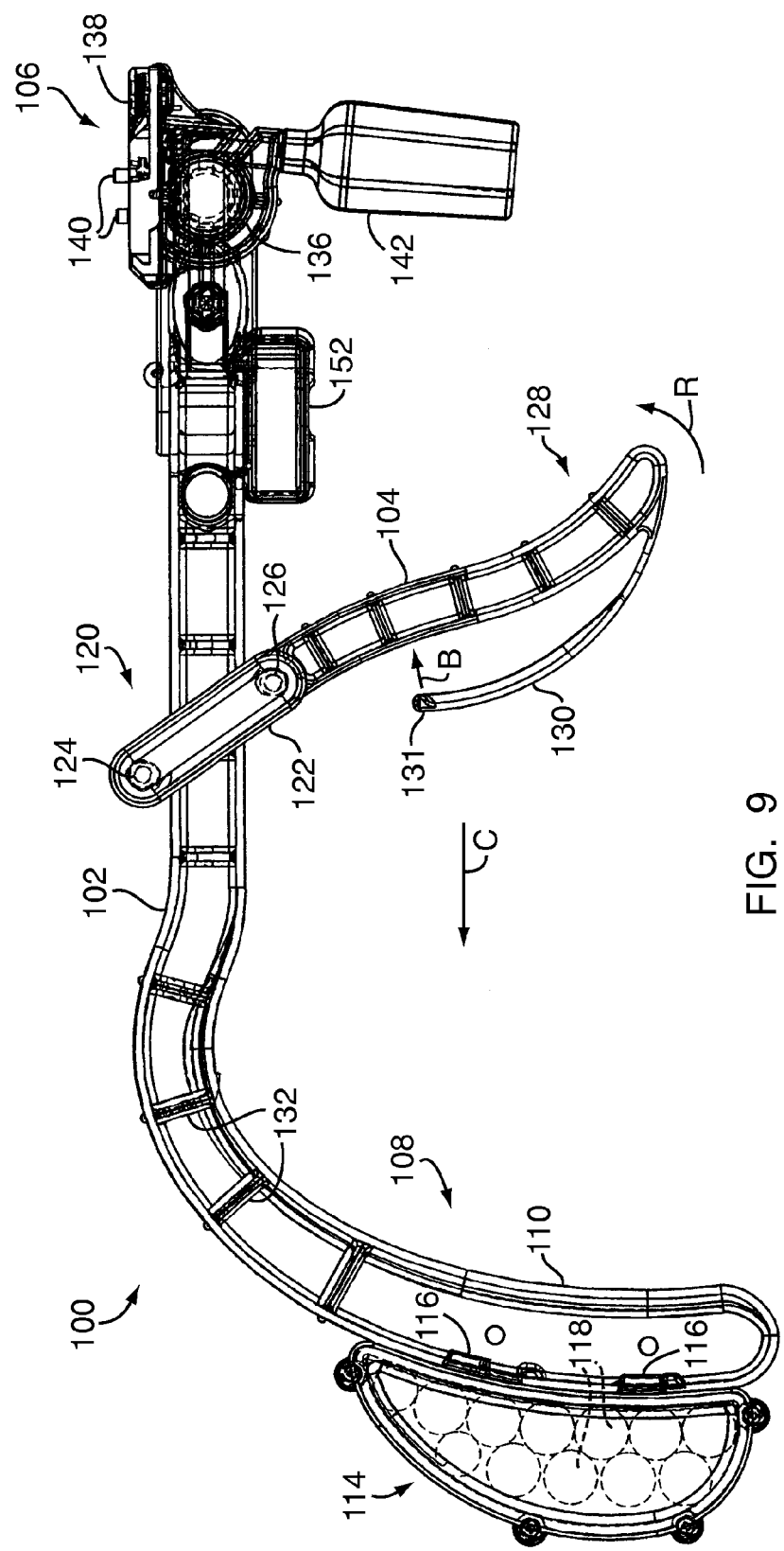
FIG. 9 is a partial cross-sectional side view of the ergonomic support assembly, according to the one embodiment of the present invention.
Figure 10:
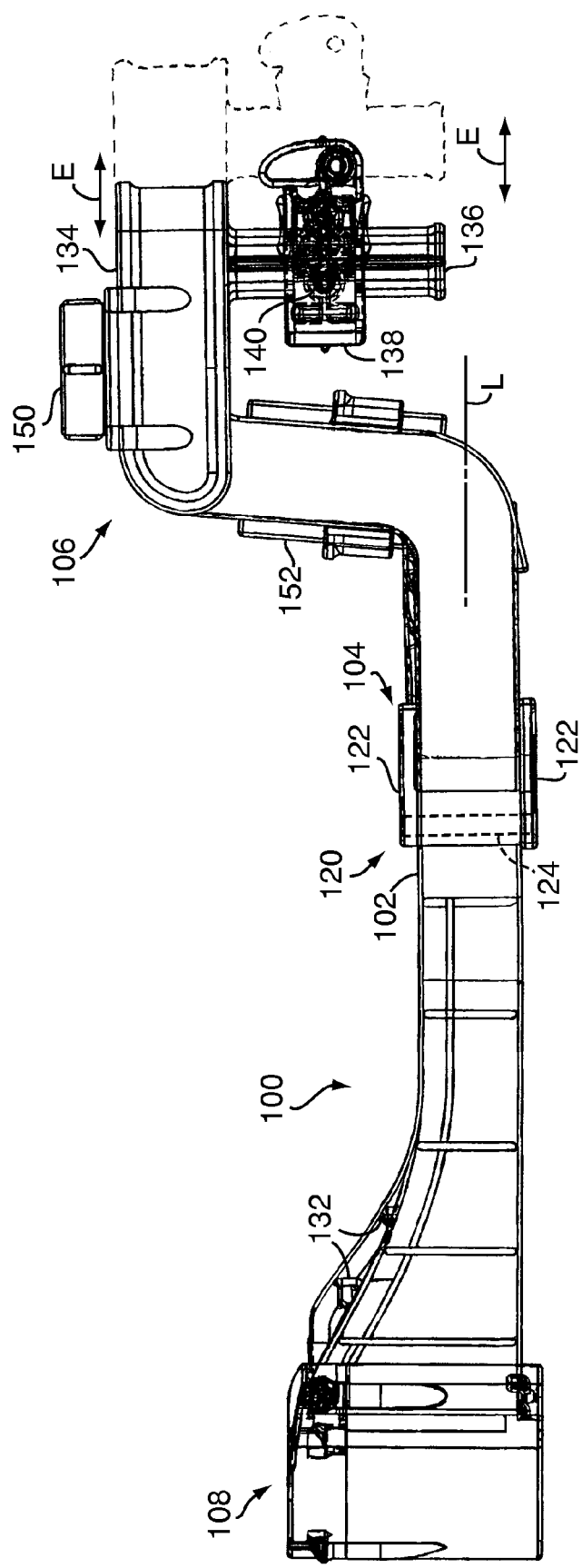
FIG. 10 is a partial cross-sectional front elevational view of the ergonomic support assembly shown in FIG. 9.
Figure 11:
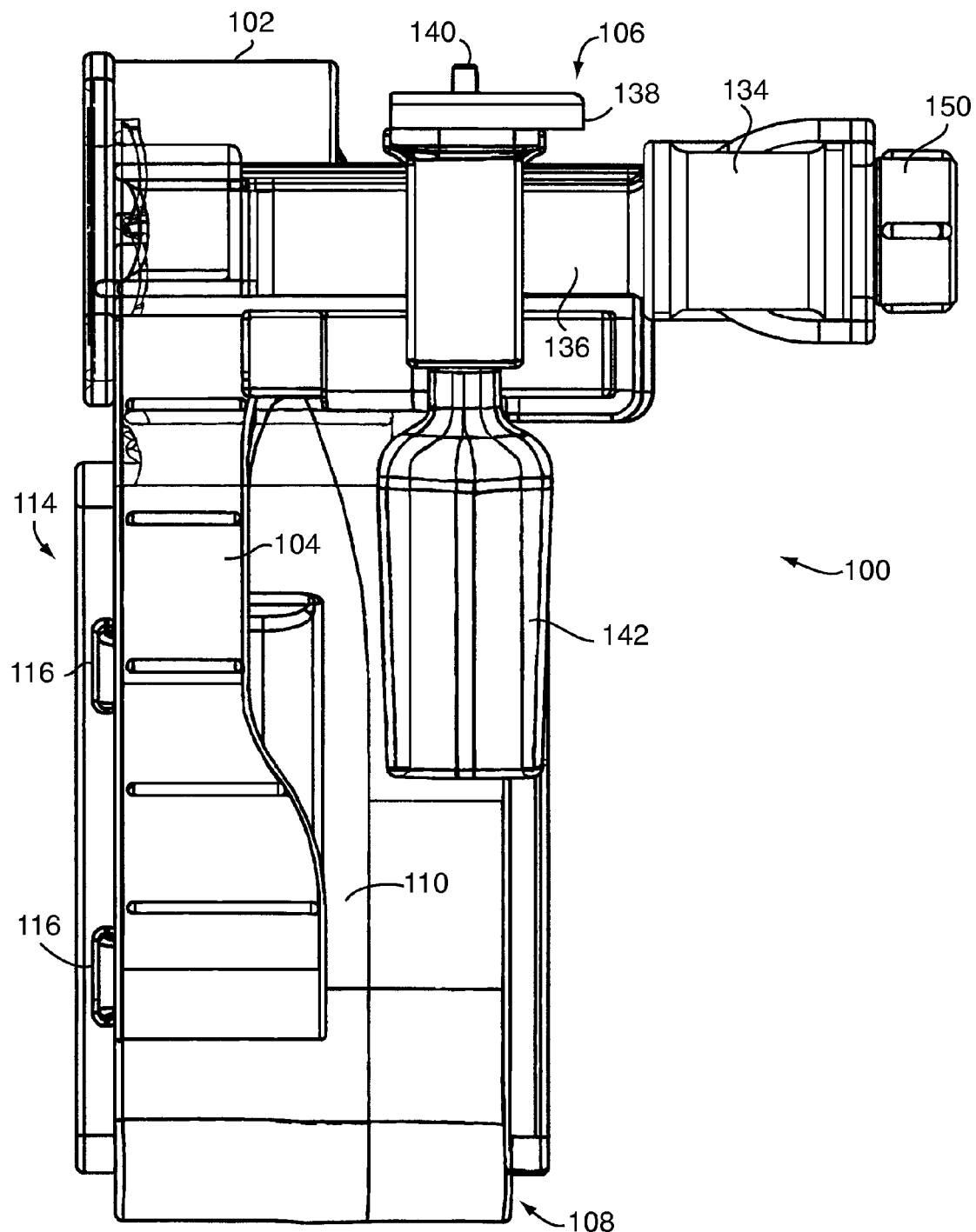
FIG. 11 is a partial cross-sectional side view of the ergonomic support assembly shown in FIG. 9.

FIGS. 9-11 illustrate yet another embodiment of a self-locking ergonomic support assembly for optical devices. Referring to FIGS. 9-11 in general, an ergonomic support assembly 100 is shown in accordance with a preferred embodiment of the present invention. As shown therein, the ergonomic support assembly 100 is formed to include a contoured main support 102 and a friction lock arm 104. The friction lock arm 104 is slidably disposed on the contoured support 102 and may be selectively positioned along the length of the contoured support 102 to capture the upper torso of an operator, as will be discussed in more detail later.

The contoured support 102 further includes two opposing distal ends, an optical device attachment end 106 and a grappling end 108. As best shown in FIG. 9, the grappling end 108 is primarily adapted to generally conform to the shoulder and upper torso area of an operator. Thus, when the ergonomic support assembly 100 is employed by an operator, the inside surface 110 of the grappling end 108 will generally envelop and substantially contact the rear of an operator's shoulder blade and upper torso. Although FIGS. 9-11 illustrate a preferred profile of the grappling end 108 of the contoured support 102, the present invention contemplates a contoured support 102 of varying profiles, the variety of which are equally encompassed by the present invention.

Returning to FIG. 9, a counterweight and power source component 114 is shown being releasably affixed to the grappling end 108. A number of latches, snaps, or the like, 116 are provided to the component 114 so as to effect the selective mating between the component 114 and the grappling end 108. In a most preferred embodiment of the present invention, the latches 116 may be arranged in conformance with Anton Bauer's® own proprietary Gold Mount® battery configuration. Although the component 114 may be fashioned as a simple dummy load, or dead weight, to offset the weight of any optical device mounted adjacent the attachment end 106, a preferred embodiment of the present invention resides in accommodating the power source 118 therein. It will be readily appreciated that the power source 118 may be of any type, shape or size, including but not limited to conventional alkaline or rechargeable batteries, fuel cell power cells, compressed gas cartridges, or the like.

Thus, it is an important aspect of the present invention to utilize the weight of the power source 118 to counter-balance the weight of the optical device mounted adjacent the attachment end 106.

Returning to FIGS. 9 and 10 in combination, a fuller description of the friction-lock arm 104 and its operation will now be discussed. As depicted in FIG. 9, the friction-lock arm 104 includes a upper portion 120 defined by substantially parallel arms 122 mated to one another via an upper and lower friction post, 124 and 126 respectively. The upper and lower friction posts, 124 and 126, are displaced from one another by a distance greater than the outer dimensions of the contoured support 102. In this manner, and when the lower portion 128 is rotated in the general direction R, the contoured support 102 will pivot, bring both the lower and the upper friction posts, 124 and 126, into contact with opposing sides of the contoured support 102. When so biased, slidable movement of the friction-lock arm 104 along the contoured support 102 will be arrested.

It is therefore another important aspect of the present invention that the friction-lock arm 104 is selectively positionable along the contoured support 102, and may be arrested at an infinite number of positions there along through the frictional interplay between the contoured support 102 and the upper and the lower friction posts, 124 and 126, of the friction-lock arm 104.

FIG. 9 also illustrates another important aspect of the present invention through its depiction of the biasing leg 130 of the friction-lock arm 104. As shown in FIG. 9, the biasing leg 130 is integrally molded or otherwise formed with the lower portion 128 of the friction-lock arm 104 so as to include a free end 132. The entire biasing leg 130 is susceptible to a measured amount of deformation that causes the free end 132 to move in a general direction B towards the main body of the friction-lock arm 104.

In operation, the ergonomic support assembly 100 is placed about the shoulder and upper torso of an operator, with the inside surface 110 of the grappling end 108 generally contacting the operator's shoulder blade and back. The operator would then selectively positions the friction-lock arm 104 by drawing the friction-lock arm 104 in the direction C, towards the operator's chest. It will be readily appreciated that when the biasing leg 130 contacts the chest of the operator, the friction-lock arm 104 will pivot in direction R, thereby causing the upper and the lower friction posts, 124 and 126, to frictionally lock against the opposing surfaces of the contoured support 102.

Moreover, the elastic deformation of the biasing leg 130 against the chest of the operator continually maintains the friction-lock arm 104 in its frictionally locked orientation with respect to the contoured support 102. Thus, the upper torso of the operator may be releasably and effectively captured between the grappling end 108 and the frictionally arrested friction-lock arm 104.

As described above, the ergonomic support assembly 100 provides an effectively and mechanically elegant means to capture the upper torso of an operator regardless of the dimensional verities of any particular operator. Indeed, a preferred embodiment of the present invention involves molding or otherwise forming the contoured support 102 as a substantially unitary element. That is, a preferred embodiment of the present invention involves molding the contoured support 102 as one integral piece, from plastic, wood, metal or other ceramic or polymer material. In this manner, the contoured support 102 avoids any structural weaknesses that may be inherent in support assemblies for optical devices that employ joints, or the like. Moreover, by molding the contoured support 102 from plastic or polymer material, the overall weight of the ergonomic support assembly 100 may be effectively addressed and reduced.

Still yet another advantageous result flows from molding the ergonomic support assembly 100 from a plastic or polymer material, in that it is possible to form externally accessible clips 132 about the length of the contoured support 102. As best shown in FIG. 10, the clips 132 are distributed along the contoured support 102 and are sized to accommodate an electrical cable for carrying power from the power source 118 to the optical device mounted adjacent the attachment end 106.

It should be appreciated that the externally accessible clips 132 permit the ready inspection of the electrical cable mounted thereto, as well as permitting the replacement of the same without requiring the disassembly of the ergonomic support assembly 100. As will be appreciated, electrical connection between the electrical cable running through the clips 132 and the power source 118 may be accomplished either through matching access ports being formed in the grappling end 118 and the component 114, or alternatively, by terminating the end of the electrical cable at the latches 116 such that mounting of the component 114 to the contoured support 102 completes the electrical connection.

Discussion of the attachment end 106 of the ergonomic support assembly 100 will now be undertaken. As best shown in FIG. 10, the contoured support 102 includes an integrally formed and laterally offset portion 134. The laterally offset portion 134 is oriented to be substantially parallel to the longitudinal axis L of the contoured support 102 and includes an adjustment gantry 136 extending therefrom. The adjustment gantry 136 supports a slidable mounting plate 138, upon which an optical device may be mounted via threaded receptacles or posts 140, in any known fashion.

The present invention laterally displaces the offset portion 134 so as to ensure that the optical device attached to the mounting plate 138 is substantially aligned with an eye of the operator. In this regard, it will be readily appreciated that the length of the gantry 136 is substantially equal to the lateral displacement of the offset portion 134, thereby permitting specific alignment between the eye of an operator, and the viewing port of the optical device.

When it is desired to align a conventional viewfinder eyepiece with an eye of an operator, the mounting plate 138 upon which the optical device is mounted can be slid in the direction of the offset portion 134. Alternatively, when a flip-out view-screen is utilized, the gantry 136 permits the mounting plate to slide in a direction away from the offset portion 134, thus ensuring that the flip-out view-screen is again substantially aligned with the eye of the operator.

As best shown in FIGS. 9 and 11, a tensioning handle 142 is operatively connected with the mounting plate 138 such that rotation of the tensioning handle 142 in a first direction causes the mounting plate 142 to become arrested at a predetermined point along the gantry 136. Rotation of the tensioning handle in a second, opposing direction causes the corresponding loosening of the mounting plate 138 with respect to the gantry 136, thereby permitting the mounting plate 138 to slid along the gantry 136.

In addition to selectively arresting the mounting plate 138 along the gantry 136, the tensioning handle 142 also provides a stabilization grip for an operator. The tensioning handle 142 therefore provides a means for increased support and stabilization of the optical device, when needed or desired.

As described herein, it is an important aspect of the present invention that a hands-free stabilization of the ergonomic support assembly 100 may be accomplished via a simple and infinitely adjustable friction-coupled clamping mechanism. Thus, by merely manipulating the friction-lock arm 104 until the biasing leg 130 contacts the chest of an operator, the ergonomic support assembly 100 may be securely—yet releasably—affixed to the upper torso of an operator. Moreover, the capturing of an operator's upper torso and shoulder area between the friction-lock arm 104 and the inside surface 110 provides a sufficient enough bias to the lower portion 128 that the attachment end 106 of the contoured support 102 is not permitted to deflect downwards. Thus, any optical device releasably affixed to the mounting plate 138 is maintained in an operative position.

Another advantageous attribute of the ergonomic support assembly 100 is its ability to accommodate optical devices of varying sizes and lengths. As best seen in FIG. 10, an extension knob 150 may be selectively employed to permit the offset portion 134 to slide in the direction E. Thus, the gantry 136 and the mounting plate 138 can be selectively displaced and extended so as to accommodate optical devices having longer main body portions that typically require more clearance between the eye of an operator and the viewfinder or view-screen of the optical device. As will be appreciated, the extension knob 150 may be rotated to selectively fix the offset portion 134 at a desired extension distance.

A clip-holder 152 is also provided to the ergonomic support assembly 100, and is releasably attached beneath the contoured support 102, as shown in FIGS. 9 and 10. The clip-holder 152 is preferably designed to accommodate the micro-cassettes and tapes commonly utilized in motion photography, although other films, batteries, and related photographic equipment may be stored therein without departing from the broader aspects of the present invention.

It will be readily appreciated that in stark contrast to known camera support systems, the present invention significantly reduces the physical structure needed to hold the ergonomic support assembly 100 to the operator's body. Moreover, the frictional nature of the friction-lock arm 104 provides an easily, and infinitely, adjustable clamping mechanism whose clamping force may be modified to fit the comfort and needs of a particular operator.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. A support assembly for supporting an optical recording device in front of an operator, comprising:
   a shaft having a first distal end for mounting said optical recording device adjacent thereto, and a second distal end for bearing against a back of said operator;
   a friction plate slidably disposed on said shaft; and
   wherein slidable movement of said friction plate selectively captures said operator between said friction plate and said second distal end, thereby causing said friction plate to frictionally lock against said shaft.

2. The support assembly according to claim 1, wherein:
   said friction plate includes a hinged portion that is pivotably biased in a direction towards said second distal end.

3. The support assembly according to claim 1, further comprising:
   an electrical power cable housed within said shaft, and extending through said shaft from said first distal end to said second distal end.

4. The support assembly according to claim 1, wherein:
   said shaft is comprised of a first section and a second section, said first section and said second section being releasably detachable from one another via a release knuckle.

5. The support assembly according to claim 4, further comprising:
   a first electrical power cable housed within said first section and a second electrical power cable housed within said second section; and
   wherein electrical communication between said first electrical power cable and said second electrical power cable is enabled by the selective mating of said first section and said second section at said release knuckle.

6. The support assembly according to claim 4, wherein:
   a longitudinal axis of said first section is arranged at an angle to a longitudinal axis of said second section.

7. The support assembly according to claim 6, further comprising:
   a mounting block slidably affixed adjacent to said first distal end, said mounting block releasably mating with said optical recording device.

8. The support assembly according to claim 7, wherein:
   said mounting block being capable of sliding by a distance commensurate with said angle, such that said optical recording device can be selectively arranged along said longitudinal axis of said second section.

9. The support assembly according to claim 1, further comprising:
   an electrical power cable disposed within said shaft; and
   an electrical power source releasably mounted to said second distal end and providing electrical power to said optical recording device via said electrical power cable, said electrical power source acting as a counterweight to said optical recording device.

10. A method for supporting an optical recording device about a torso of an operator, said method comprising the steps of:
    mounting said optical recording device adjacent a first distal end of a shaft, said shaft having a bearing surface mounted adjacent a second distal end of said shaft for bearing against a back of said torso;
    slidably affixing a friction plate on said shaft;
    selectively sliding said friction plate in opposition to said bearing surface; and
    capturing said torso between said friction plate and said second distal end via the slidable movement of said friction plate, wherein said friction plate frictionally locks against said shaft when said friction plate contacts said torso.

11. The method for supporting an optical recording device about a torso of an operator according to claim 10, said method further comprising the steps of:
    pivotably biasing a hinged portion of said friction plate in a direction towards said bearing surface.

12. The method for supporting an optical recording device about a torso of an operator according to claim 10, said method further comprising the steps of:
    arranging an electrical power cable through said shaft from said first distal end to said second distal end.

13. The method for supporting an optical recording device about a torso of an operator according to claim 10, said method further comprising the steps of:
    securing an electrical power cable through externally exposed clips formed on said shaft.

14. The method for supporting an optical recording device about a torso of an operator according to claim 10, said method further comprising the steps of:
    forming said shaft to have a first section and a second section, said first section and said second section being releasably detachable from one another via a release knuckle.

15. The method for supporting an optical recording device about a torso of an operator according to claim 14, said method further comprising the steps of:
    arranging a first electrical power cable within said first section and a second electrical power cable within said second section; and
    enabling electrical communication between said first electrical power cable and said second electrical power cable by mating of said first section and said second section at said release knuckle.

16. The method for supporting an optical recording device about a torso of an operator according to claim 14, said method further comprising the steps of:
orienting a longitudinal axis of said first section to be at an angle to a longitudinal axis of said second section.

17. The method for supporting an optical recording device about a torso of an operator according to claim 16, said method further comprising the steps of:
slidably affixing a mounting block adjacent said first distal end, said mounting block releasably mating with said optical recording device; and
forming said mounting block so as to be capable of sliding by a distance commensurate with said angle, whereby said optical recording device can be selectively arranged along said longitudinal axis of said second section.

18. The method for supporting an optical recording device about a torso of an operator according to claim 10, said method further comprising the steps of:
forming a laterally offset portion adjacent said first distal end, wherein said laterally offset portion is oriented to be substantially parallel to a longitudinal axis of said shaft.

19. The method for supporting an optical recording device about a torso of an operator according to claim 18, said method further comprising the steps of:
providing an extension knob to said laterally offset portion, and wherein operation of said extension knob selectively permits one of an extension and a retraction of said laterally offset portion.

20. The method for supporting an optical recording device about a torso of an operator according to claim 10, said method further comprising the steps of:
arranging an electrical power cable within said shaft;
releasably mounting an electrical power source to said second distal end; and
providing electrical power to said optical recording device via said electrical power cable, said electrical power source providing a counterweight to said optical recording device.

21. A support assembly for supporting an optical recording device in front of an operator, comprising:
a contoured support having a first distal end for mounting said optical recording device adjacent thereto, and a second distal end for bearing against a back of said operator;
an arm slidably disposed on said contoured support; and
wherein pivoting movement of said arm selectively causes a friction post to bear against said contoured support, thereby causing said arm to frictionally lock against said contoured support.

22. The support assembly according to claim 21, wherein:
said arm includes a biasing leg having a free distal end that is capable of deflection towards said arm.

23. The support assembly according to claim 21, wherein:
said contoured support includes a laterally offset portion.

24. The support assembly according to claim 23, wherein:
said laterally offset portion is displaced from and substantially parallel to a longitudinal axis of said contoured support.

25. The support assembly according to claim 23, further comprising:
an extension knob whose operation selectively permits one of an extension and a retraction of said laterally offset portion.

26. The support assembly according to claim 23, further comprising:
a mounting plate slidably affixed adjacent to said laterally offset portion, said mounting block releasably mating with said optical recording device.

27. The support assembly according to claim 26, wherein:
said mounting plate being capable of sliding by a distance substantially equal to said displacement of said offset portion, such that said optical recording device can be selectively arranged along said longitudinal axis of said contoured support.

* * * * *